United States Patent [19]

De Long et al.

[11] Patent Number: 5,585,999
[45] Date of Patent: Dec. 17, 1996

[54] SUPERCAPACITOR ELECTROCHEMICAL CELL

[75] Inventors: Hugh C. De Long; Richard T. Carlin, both of Colorado Springs, Colo.

[73] Assignee: The United States of America as represented by the Secretary of the Air Force, Washington, D.C.

[21] Appl. No.: 317,160

[22] Filed: Sep. 30, 1994

[51] Int. Cl.$^6$ ........................................... H01G 9/02
[52] U.S. Cl. ..................... 361/505; 361/508; 361/516; 361/509; 429/112
[58] Field of Search ........................... 361/505, 502, 361/508, 516, 532, 528; 29/25.03, 25.42; 429/103, 112, 199, 218; 204/39, 60

[56] References Cited

U.S. PATENT DOCUMENTS

| | | | |
|---|---|---|---|
| 4,485,152 | 11/1984 | Homan et al. | 428/670 |
| 4,740,869 | 4/1988 | Morimoto et al. | 361/433 |
| 5,079,674 | 1/1992 | Malaspina | 361/502 |
| 5,096,789 | 3/1992 | Melton et al. | 429/112 |
| 5,202,042 | 4/1993 | Tsuji et al. | 252/62.2 |

Primary Examiner—Leo P. Picard
Assistant Examiner—Anthony Dinkins
Attorney, Agent, or Firm—Thomas C. Stover

[57] ABSTRACT

The present invention provides a thin-film palladium electrode as a reversible redox-active positive electrode in a supercapacitor configuration. A room-temperature chloroaluminate molten salt composed of an organic chloride, mixed with a molar excess of aluminum chloride, is used as the supercapacitor electrolyte. In this electrolyte, the palladium surface can be reversibly oxidized to an insoluble thin-film of palladium chloride. Reduction of this palladium chloride thin film back to palladium metal, generates a high current density. The capacitance of this supercapacitor electrode is 150–550 times that of a double-layer capacitor electrode. By combining the thin-film palladium supercapacitor positive electrode (cathode) with a suitable negative electrode (anode), e.g. a metallic aluminum anode, a high power supercapacitor cell, capable of delivering a charge at high current density, at near constant voltage of ca.1 V, is provided per the present invention. The cell of the invention can accordingly provide power for devices requiring pulsed electric power, e.g. lasers and for numerous other systems of high current demand, e.g. starters for electric vehicles.

14 Claims, 2 Drawing Sheets

SUPERCAPACITOR ELECTROCHEMICAL CELL

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a supercapacitor cell, particularly a cell that is capable of delivering a charge at high current density.

2. The Prior Art

Current high power capacitors rely on the charging and discharging of an electrolyte double-layer to store and deliver electrical energy. Most of these double-layer capacitors use high surface area carbon-electrodes which can have gravimetric areas of over $10^7 cm^2 g^{-1}$. However, the double-layer capacitance of these electrodes in aqueous or organic electrolytes, is limited to only about 10–150 micro uF $cm^{-2}$.

The concept of using surface or absorbed redox couples in capacitor applications is known. These "supercapacitor" systems rely on faradaic processes to store and deliver charge. For these systems to function, the species formed on charging must be insoluble in the electrolyte or absorbed into the electrode surface so that the current achieved during discharge has no diffusion limitations. It is also advantageous to have the discharged species to remain on the electrode to facilitate charging but this is not required for the supercapacitor to function. Examples of redox processes which function as supercapacitor electrodes are underpotentially deposited hydrogen on platinum, underpotentially deposited lead on gold and insoluble transition metal oxides/hydroxides (e.g., $RuO_2$ and $IrO_2$).

For a further description of the above prior art systems, see *Transition From "Supercapacitor" to "Battery" Behavior in Electrode Chemical Energy Storage*, B. E. Conway, J. Electrochem. Soc., 138, 1539 (1991), which is incorporated herein by reference.

The above Conway Article is directed to the redox of hydrous oxides in aqueous electrolytes. These supercapacitors are described as being able to produce a capacitance of up to 2000 micro μF $cm^{-2}$.

However a supercapacitor with a considerably greater capacitance than that found in the prior art is desirable and there is need and market for one that overcomes the above prior art shortcomings.

There has non been discovered a supercapacitor cell with a greatly increased capacitance over those found in the prior art, which cell operates with a high rate of discharge and with redox reversibility.

SUMMARY OF THE INVENTION

Broadly the present invention provides a supercapacitor electrochemical cell comprising:

a) a cell housing, b) an electrolyte of a chloroaluminate molten salt in said housing, c) a palladium-containing cathode mounted in the electrolyte and d) an anode mounted in the electrolyte and spaced from the cathode, the anode being more negative than the cathode, on discharge of the cell, which anode has a redox couple within the electrochemical window of the electrolyte, such that the cell can deliver a charge at high current density.

By "cathode" of a cell, as used herein, is meant the electrode where reduction takes place on discharge of the cell, e.g. where $PdCl_2$ is reduced to Pd.

By "anode", of a cell, as used herein, is meant the electrode where oxidation takes place on discharge of the cell.

By convention, the location of the cathode and anode do not change even when a cell is being recharged (which reverses the polarity of the electrodes), e.g. by a DC power supply.

By "high current density" as used herein, is meant 0.1 to 1.0 amperes/$cm^2$, based on an active (e.g. porous) electrode area of about five to ten times (or more) its geometric area.

By "redox couple" as used herein, is meant a reversible reduction-oxidation electrochemical process.

In the above cathode the palladium is suitably deposited on an inert substrate of high-surface area. Such cell can then be re-charged to convert the palladium to a palladium chloride thin-film, e.g. as shown in FIG. 4 hereof, ready for discharge at high current density as a reversible redox cell per the above invention.

In a preferred embodiment, the anode is of metallic aluminum but can be of other materials as described below.

BRIEF DESCRIPTION OF THE DRAWINGS

The invention will become more apparent from the following detailed specification and drawings in which.

DESCRIPTION OF PREFERRED EMBODIMENTS

Figure 1:
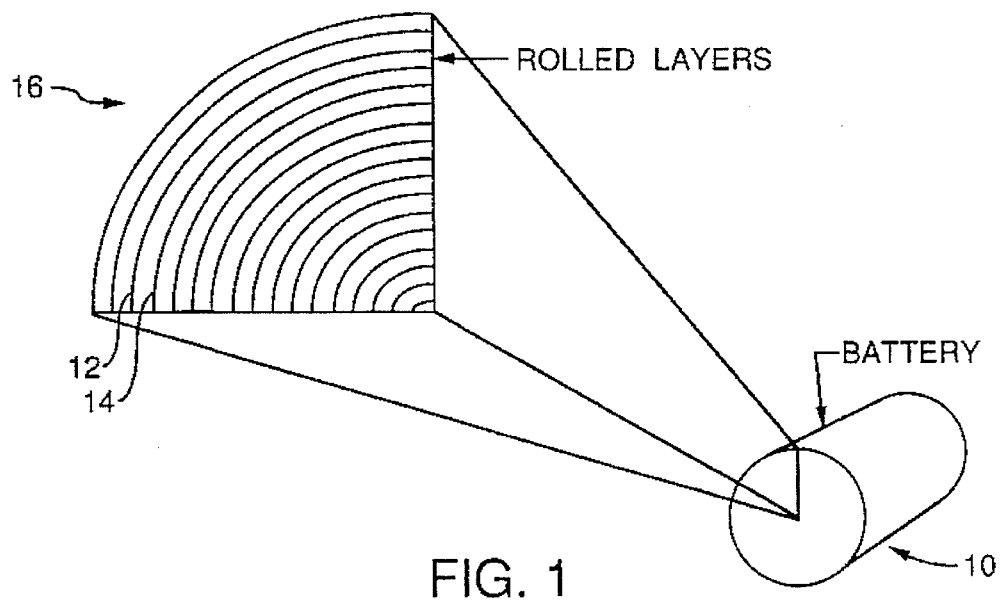
FIGS. 1, 2 and 3 are progressive schematic perspective enlargements of a section of the supercapacitor cell embodying the present invention

Referring in more detail to the drawings, we have supercapacitor cell 10 having rolled layers 12 and 14, as shown in blow-up section 16 of FIG. 1.

Figure 2:
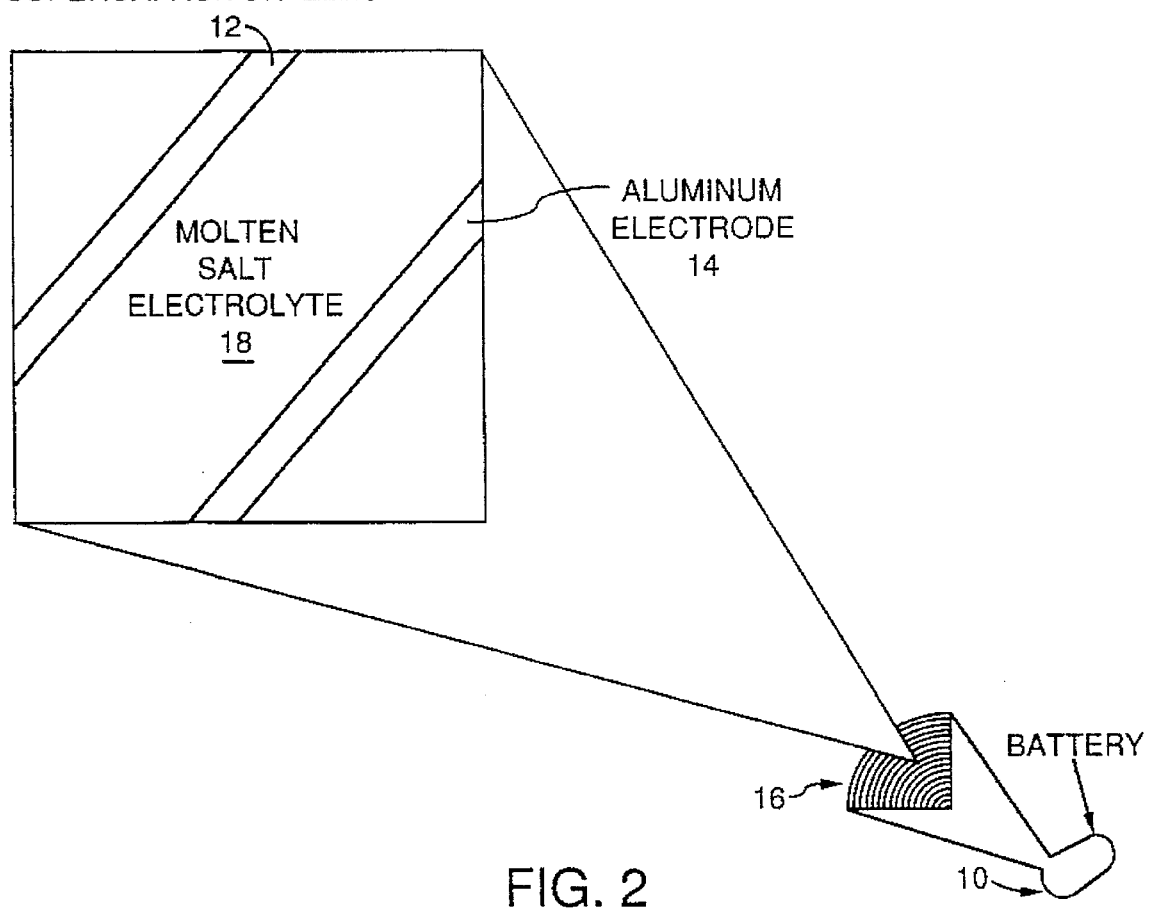

As shown in FIG. 2, a portion of section 16 is blown-up to section 20 to show an enlarged view of palladium/palladium chloride cathode 12, aluminum anode 14 and molten salt electrolyte 18 therearound.

Figure 3:
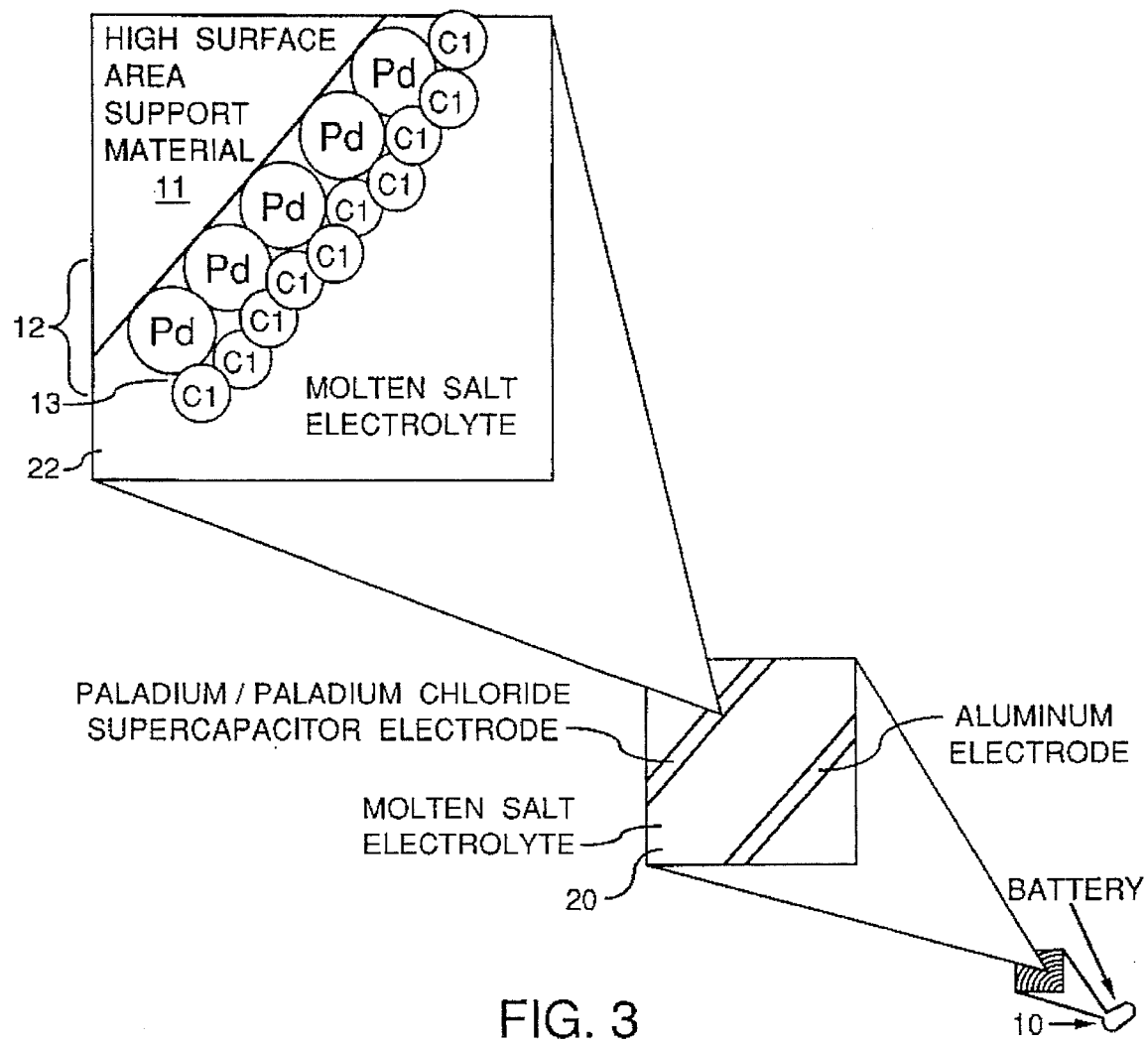

A further blow-up of the palladium/palladium chloride cathode of FIG. 2 is shown in FIG. 3 where the cathode 12 is enlarged sufficiently to show a thin-film insoluble layer of palladium chloride ($PdCl_2$) 13 deposited on an inert high-surface substrate 11; which thin-film and substrate together define the cathode 12, as shown in blow-up section 22.

Figure 4:
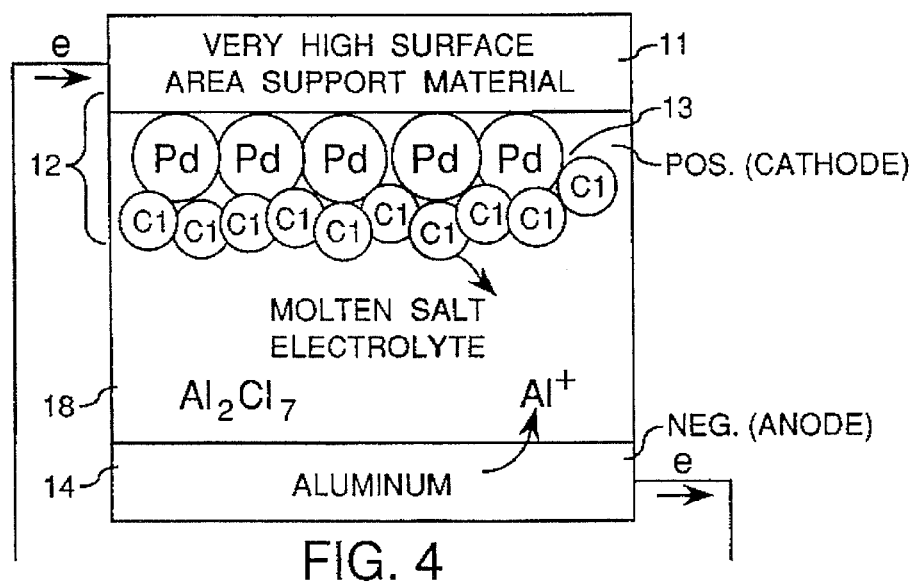
FIG. 4 is a schematic view of the reversible redox supercapacitor elecrochemical cell embodying the present invention.

The supercapacitor cell 10 of FIGS. 1, 2, and 3 is shown in schematic in FIG. 4 in the charged state. That is, the Pd cathode 12 has been charged so as to convert the metallic Pd to an insoluble film 13 of $PdCl_2$ opposed by a spaced anode 14 of aluminum with a chloraluminate molten salt electrolyte 18 therebetween, per FIG. 4.

As indicated in FIG. 4, the cathode 12, on discharge, is the positive electrode (as PdCl$_2$ is being reduced to Pd) and the anode 14 is the negative electrode as indicated.

After the discharge of the supercapacitor cell 10 (which is fast and at high current density), e.g. of FIG. 4, such cell is re-charged and the polarity of the respective electrodes reverses i.e. electrode 12 becomes negative (though still the cathode) and electrode 14 becomes positive (though still the anode).

The above charge and discharge reactions of the supercapacitor cell 10 are summarized below as equation [2].

Turning now to supercapacitor cell theory, it is noted that unlike double-layer capacitors which must operate over a relatively wide voltage range, the cell of the invention operates within a few milivolts of the thermodynamically reversible potential of the redox process and so delivers its stored charge at a relatively constant voltage.

The capacitance of the supercapacitor cell can be calculated according to:

$$C = (Q/A)\ (F/RT)\ (0.25) \qquad [1]$$

where C is the capacitance in Farads per unit area of the electrode, Q is the faradaic charge in coulombs stored or delivered by the electrode, A is the electrode area, F is the Faraday constant, R is the molar gas constant (J mol$^{-1}$–K$^{-1}$), and T is temperature in degrees Kelvin.

As indicated above, a palladium metal cathode is reversibly oxidized to a thin film (of, e.g. 1 monolayer) of an insoluble palladium(II) chloride species (PdCl$_2$) in a room-temperature chloroaluminate molten salt electrolyte. This species also occurs on a thin film of palladium electrodeposited onto an inert substrate. Also, as indicated above, high cathodic currents are achieved during fast reduction of such palladium chloride thin film back to palladium metal. The above reversibility and high rate of reduction make the palladium/palladium chloride surface redox couple, applicable as a supercapacitor electrode. Using a Q/A value of 560 μC cm$^{-2}$, a capacitance of almost 5500 μF cm$^{-2}$ is calculated from Eq. [1]. This value is 150–550 times the capacitance of a double-layer capacitor using carbon electrodes. The palladium supercapacitor electrode also benefits from having an insoluble discharge form (palladium metal) which facilitates charging.

As indicated above, the present invention relates to the use of a thin-film palladium electrode as a reversible redox-active positive electrode in a supercapacitor configuration. A room-temperature chloroaluminate molten salt, composed of an organic chloride (for example, 1-ethyl-3-methylimidazolium chloride) mixed with a molar excess of aluminum chloride, is used as the supercapacitor electrolyte. In this electrolyte, the palladium surface can be reversibly oxidized to an insoluble thin film of palladium chloride. Reduction of this palladium chloride thin film back to palladium metal is reversible and generates a high current density. The capacitance of this supercapacitor electrode is 150–550 times that of a double-layer capacitor electrode.

By depositing palladium metal onto a high-surface area inert substrate, a thin-film, high-surface-area palladium supercapacitor electrode can be produced. For example, a thin film of palladium deposited on a high-surface area carbon substrate can produce a supercapacitor electrode having a capacitance of over (5500 μF cm$^{-2}$)(10$^7$cm$^2$ g$^{-1}$)= 5.5×10$^4$F g$^{-1}$. The charge stored can be (560 μC cm$^{-2}$)(10$^7$cm$^2$g$^{-1}$)=5.6×10$^3$C g$^{-1}$. The weight (and cost) of palladium are minimal because only, e.g. 1–10 atomic layers of palladium are needed for the supercapacitor electrode to function. For example, a thin film of palladium can be electrodeposited onto a glassy carbon member.

By combining the thin-film palladium supercapacitor positive electrode cathode with e.g. a metallic aluminum negative electrode (anode), a high power supercapacitor of (10$^{-3}$A cm$^{-2}$)(10$^7$cm$^2$g$^{-1}$)(1 V)=10 kW g$^{-1}$, which has a constant voltage of ca. 1 V, can be constructed. It is known that an aluminum electrode can be rapidly charged (electrodeposited) and discharged (anodized) in the chloroaluminate molten salts needed for the thin-film palladium supercapacitor electrode. The net supercapacitor reaction can thus be written:

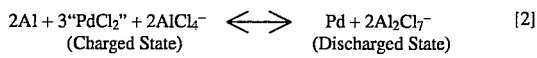

$$2Al + 3\text{"PdCl}_2\text{"} + 2AlCl_4^- \iff Pd + 2Al_2Cl_7^- \qquad [2]$$
(Charged State) ⟷ (Discharged State)

The aluminum metal electrode has a high electricity storage density (10.7×10$^3$ C g$^{-1}$) which is ideally suited for combination with the thin-film palladium supercapacitor electrode in the cell embodying the invention.

The thin-film palladium supercapacitor electrode has a capacitance 150–550 times that of a double-layer capacitor electrode and more than two times the capacitance of the supercapacitor described in the above referenced Article by B. E. Conway. A high-surface-area, thin-film palladium supercapacitor electrode can be produced by electrodeposition of palladium onto a high-surface-area inert support.

Metallic aluminum can be used as the negative electrode (anode) in a supercapacitor employing a thin-film palladium supercapacitor positive electrode. Such a supercapacitor can store >10$^3$ coulombs per gram. This charge can be delivered at a high current density and at a constant voltage of, ca.1 volt.

In the supercapacitor cell of the invention, the cathode can be of palladium/palladium chloride or any other metal/metal chloride which undergoes a reversible redox process in the electrochemical window of the electrolyte, e.g. nickel/nickel chloride, Ni/NiCl$_2$.

Also the inert cathode substrate can be of porous carbon, inert metal sponge or any inert high-surface-area support.

The anode can be of metal, polymer, intercalating material or a metal/metal chloride with a more negative redox couple than the above cathode. Thus the metal anode can be of metallic aluminum, or any alkali metal, alkaline earth metal or transition metal in the Periodic Table. The polymer anode can be of polystyrene, polypyrrole, polyaniline or polythiophine or other redox active or conducting polymer. And the intercalating anode can be of graphite, transition metal oxides, transition metal chalcogenides or other layered compounds. Also in the supercapacitor cell embodying the invention, the electrolyte is suitably a room temperature chloroaluminate molten salt composed of an organic chloride of, e.g. substituted imidazolium, substituted ammonium, substituted phosphonium or substituted sulfonium mixed with a molar excess of aluminum chloride. The above substituted compounds can be substituted with various elements or compounds, e.g. with alkyls.

The cell of the invention can take various embodiments such as rolled layers of cathode and anode, as shown in FIGS. 1 and 2 or the cathode-anode combination indicated in FIG. 4 or other combinations thereof as desired, within the scope of the present invention.

The supercapacitor cell of the invention can provide high power for electronic devices and electric vehicles. In particular, devices requiring pulsed electric power (e.g. lasers, accellerated projectile weaponry, vehicle starters, vehicle accellerating systems, munitions, sensors and the like) will benefit from the present invention.

In sum, the concept of the present invention of using a fast redox-active palladium thin-film cathode in a chloroaluminate molten salt electrolyte is believed novel as well as the addition thereto of a suitable anode, to form a supercapacitor cell of high current discharge or pulse power.

The reduction process of the cell embodying the invention, leads to a high cathode current density which can be utilized for pulsed battery or supercapacitor applications as noted above.

What is claimed is:

1. A reversible redox supercapacitor electrochemical cell comprising:

a) a cell housing, b) an electrolyte of a chloroaluminate molten salt in said housing, c) a metal (M)-containing cathode mounted in said electrolyte and d) an anode mounted in said electrolyte and spaced from said cathode, said anode being more negative than said cathode on discharge of said cell, said anode having a redox couple within the electrochemical window of said electrolyte, such that said cell can deliver a charge at high current density, said cell being reversible such that on charge thereof, the cathode oxidizes to $MCl_2$ as in insoluble thin-film and on discharge thereof the cathode reduces back to M to define a $M/MCl_2$ cathode wherein M is selected from the group consisting of Pd and Ni.

2. The cell of claim 1, wherein said cathode has at least one $Pd/PdCl_2$ layer mounted to an inert substrate of high surface area.

3. The cell of claim 2 wherein said substrate is porous carbon.

4. The cell of claim 1 wherein said anode is of metallic aluminum.

5. The cell of claim 4 having in a net capacitor reaction, the following reaction products:

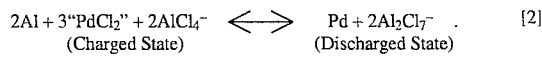

6. The cell of claim 1 wherein the cathode has a thin film of palladium deposited on a high-surface area carbon substrate, which cathode has a capacitance of up to $5.5 \times 10^4$ F $g^{-1}$, which cathode is able to store a charge of up to $5.6 \times 10^3$ C $g^{-1}$.

7. The cell of claim 1 being high power supercapacitor of up to 10 kW $g^{-1}$ having a near constant voltage of substantially 1 V.

8. The cell of claim 1 wherein said anode is made of a material selected from the group consisting of metal, polymer, intercalating material and a metal/metal chloride with a more negative redox couple than the above cathode.

9. The cell of claim 1 wherein the anode is of a metal selected from the group consisting of metallic aluminum, alkali metal, alkaline earth metal and transition metal.

10. The cell of claim 1 wherein said anode is of a polymer selected from the group consisting of polystyrene, polypyrrole, polyaniline and polythiophine.

11. The cell of claim 1 wherein said anode is an intercalating anode selected from the group consisting of graphite, transition metal oxides and transition metal chalcogenides.

12. The cell of claim 1 having as said molten salt, an organic chloride selected from the group consisting of 1-ethyl-3-methylimidazolium chloride, substituted imidazolium, substituted ammonium, substituted phosphonium and substituted sulfonium, mixed with a molar excess of aluminum chloride to form said electrolyte.

13. The cell of claim 1 having as said molten salt, an organic chloride selected from the group consisting of 1-ethyl-3-methylimidazolium chloride, substituted imidazolium, substituted ammonium, substituted phosphonium and substituted sulfonium, mixed with a molar excess of aluminum chloride to form said electrolyte.

14. The cell of claim 1 having alternate layers of anode and cathode with said electrolyte in-between to define a multi-layered supercapacitor cell capable of delivering a charge at high current density.

\* \* \* \* \*